US010865014B2

(12) United States Patent
Smith

(10) Patent No.: US 10,865,014 B2
(45) Date of Patent: Dec. 15, 2020

(54) FLUID SAMPLE DISPLAY TRAY

(71) Applicant: H & S Garage Gear, LLC, Spanish Fork, UT (US)

(72) Inventor: Richard Smith, Spanish Fork, UT (US)

(73) Assignee: H & S Garage Gear, LLC, Spanish Fork, UT (US)

( * ) Notice: Subject to any disclaimer, the term of this patent is extended or adjusted under 35 U.S.C. 154(b) by 265 days.

(21) Appl. No.: 15/923,296

(22) Filed: Mar. 16, 2018

(65) Prior Publication Data

US 2018/0265254 A1 Sep. 20, 2018

Related U.S. Application Data

(60) Provisional application No. 62/473,909, filed on Mar. 20, 2017.

(51) Int. Cl.

| | |
|---|---|
| ***G09B 25/00*** | (2006.01) |
| ***B65D 25/02*** | (2006.01) |
| ***B65D 21/02*** | (2006.01) |
| ***B65D 25/22*** | (2006.01) |
| ***B65D 25/20*** | (2006.01) |
| ***B25H 5/00*** | (2006.01) |
| ***B25H 3/06*** | (2006.01) |

(52) U.S. Cl.

CPC ............... *B65D 25/02* (2013.01); *B25H 3/06* (2013.01); *B25H 5/00* (2013.01); *B65D 21/0213* (2013.01); *B65D 25/205* (2013.01); *B65D 25/22* (2013.01)

(58) Field of Classification Search

USPC ... 434/98, 99, 100, 103, 105, 276, 298, 365, 434/368, 370, 373, 374, 377, 381

See application file for complete search history.

(56) References Cited

U.S. PATENT DOCUMENTS

| | | | | | |
|---|---|---|---|---|---|
| 3,508,356 | A * | 4/1970 | Ross | ...................... | B42D 15/00 40/600 |
| 3,540,858 | A | 11/1970 | Rochte et al. | | |
| 3,815,265 | A * | 6/1974 | DePauw | ................ | G09B 11/10 434/103 |
| 4,643,306 | A | 2/1987 | Ryan | | |
| 4,759,451 | A * | 7/1988 | Apps | .................... | B65D 21/041 206/505 |
| 4,911,642 | A * | 3/1990 | Knowles | ................ | G09B 11/10 206/1.8 |

(Continued)

FOREIGN PATENT DOCUMENTS

| | | | | |
|---|---|---|---|---|
| CN | 2345981 Y | 10/1999 | | |
| KR | 20-2011-0004479 * | 5/2011 | ............ | B42D 15/00 |
| KR | 20-2011-0004479 U | 5/2011 | | |

OTHER PUBLICATIONS

International Search Report dated Jul. 4, 2018, in PCT Application No. PCT/US2018/023128, filed Mar. 19, 2018; 6 pages.

(Continued)

*Primary Examiner* — Kurt Fernstrom

(74) *Attorney, Agent, or Firm* — Thorpe, North & Western, LLP

(57) ABSTRACT

A fluid sample display for displaying actual vehicle fluid samples alongside comparisons of exemplary fluids has a tray with dimples to receive the fluid samples. The dimples are coverable by a movable cover. The tray can have an indicia panel for removably receiving indicia indicative of a vehicle and/or vehicle owner.

20 Claims, 10 Drawing Sheets

(56) References Cited

U.S. PATENT DOCUMENTS

| | | | | | |
|---|---|---|---|---|---|
| 5,209,664 | A * | 5/1993 | Wilcox | B44D 3/02 | 206/1.8 |
| 5,622,675 | A * | 4/1997 | Glenday | B01L 3/5085 | 422/552 |
| 5,698,774 | A | 12/1997 | Osmanski | | |
| 5,958,714 | A * | 9/1999 | Gordon | G01N 33/52 | 210/238 |
| 6,258,326 | B1 * | 7/2001 | Modlin | B01L 3/5085 | 422/553 |
| 6,692,260 | B2 * | 2/2004 | Beck | G09B 23/24 | 434/373 |
| 6,739,345 | B2 * | 5/2004 | Stanley, III | A45D 44/005 | 132/200 |
| 9,442,102 | B2 | 9/2016 | Harpman | | |
| 2004/0026438 | A1 | 2/2004 | Tyro et al. | | |
| 2011/0268630 | A1 | 11/2011 | Williams et al. | | |

OTHER PUBLICATIONS

Network Automotive, "Preventative Maintenance Queen Creek, AZ Fluid Flushes", http://www.networkautomotive.com/Preventative-Maintenance-Queen-Creek-AZ-Fluid-Flus.html 2 pages; as accessed on Mar. 2, 2018.

BG, "Fluid Tray", http://jerrysautorepair.com/summer-is-here-is-your-vehicle-ready/bg-fluid-tray/ 3 pages; as accessed on Mar. 2, 2018.

Kwik Industries, Inc., "Fluid Sample Display Tray", http://gokwikparts.com/shop/OFFICE%20%26%20S/subcat/SHOP%20SUPPL/product/TB-DT11 3 Pages; as accessed on Mar. 2, 2018.

* cited by examiner

FLUID SAMPLE DISPLAY TRAY

PRIORITY CLAIM

Priority is claimed to U.S. Provisional Patent Application Ser. No. 62/473,909, filed Mar. 20, 2017, which is hereby incorporated herein by reference in its entirety.

BACKGROUND

Field of the Invention

The present invention relates generally to a fluid sample display tray for comparing and displaying vehicle fluid samples with respect to exemplary fluid conditions.

Related Art

Vehicle service centers, such as auto shops, mechanic shops and/or lube shops, often perform a check of fluids and make recommendations to the vehicle owner regarding fluid replacement. Sample strays have been proposed in which vials of clean fluids are presented with actual fluid samples from the vehicle. Such trays, however, can be messy and the fluid vials are exposed and subject to breakage. In addition, such fluid vials can be difficult and time consuming to fill and prepare.

SUMMARY OF THE INVENTION

It has been recognized that it would be advantageous to develop a fluid sample tray that is cleaner, and less prone to damage, and can be correlated with respect to multiple vehicles and/or owners.

The invention provides a fluid sample display which can: 1) removably receive indicia thereon indicative of a vehicle and/or owner of the vehicle; 2) seal fluid samples to resist spilling or messes with a movable cover disposable over and capable of sealing the fluid samples; 3) nest and stack with other displays to store and organize multiple trays in a multi-tray system; and 4) be hung on a wall.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

The invention provides a fluid sample display or tray that can be used to display and/or compare actual vehicle fluid samples from a vehicle with exemplary fluid conditions, or ideal fluids. For example, the vehicle fluids can comprise vehicle lubricants, such as motor oil, transmission fluid, antifreeze, power steering fluid, brake fluid, transfer case oil, differential oil, antifreeze or radiator fluid and/or antifreeze, other hydraulic fluids, or other fluids, such as window washer fluid, etc. The fluid sample display can be used by vehicle service stations or vehicle lubrication businesses that service vehicles. Such stations or businesses can obtain actual samples from a vehicle being serviced and collect the samples on the fluid sample display. The fluid sample display can also have representations of exemplary fluids thereon adjacent the actual samples for observation and comparison. Thus, such stations or businesses can demonstrate the actual fluid samples with respect to exemplary fluid conditions, and a vehicle owner can observe the demonstration and condition of the actual fluid samples with respect to exemplary conditions. The exemplary fluid conditions can be represented by actual ideal and/or exemplary fluids and/or pictures of ideal and/or exemplary fluids. In addition, the fluid sample display can cover and seal the actual vehicle fluids to resist loss and/or commingling of the actual vehicle fluids during collection and demonstration. In addition, the fluid sample display can cover and seal the actual ideal and/or exemplary fluids to resist loss and/or commingling of the actual ideal and/or exemplary fluids. In addition, the fluid sample display can have a section to receive indicia indicative of the vehicle and/or the owner in order to avoid confusion with multiple vehicles and multiple vehicle owners. In addition, the fluid sample display can have a hanger so that it can be suspended. Furthermore, the fluid sample display can be configured to be stackable with other displays in a multi-display or multi-tray system.

Figure 5:
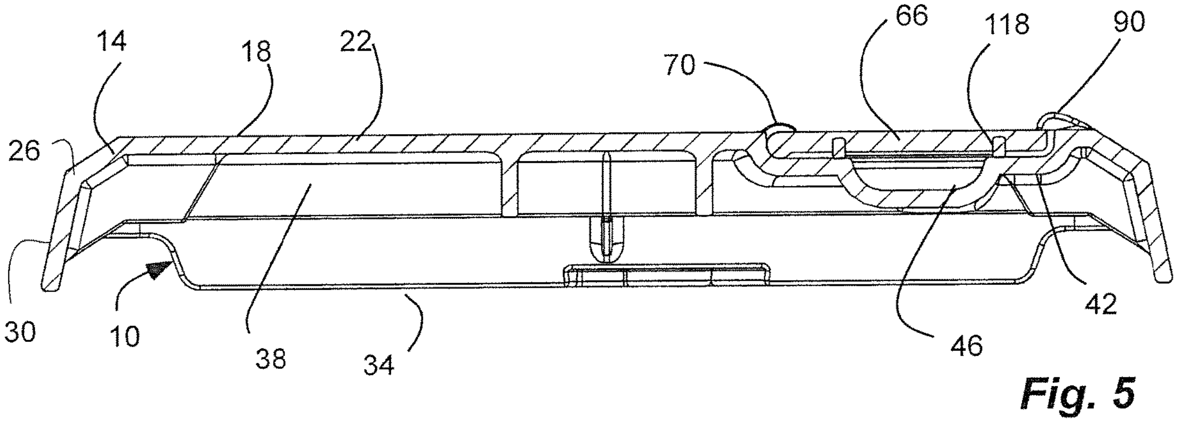
FIG. 5 is a cross-sectional end view of the fluid sample display of FIG. 1, taken along line 4 of FIG. 1, shown with the cover in a closed position.
Figure 6:
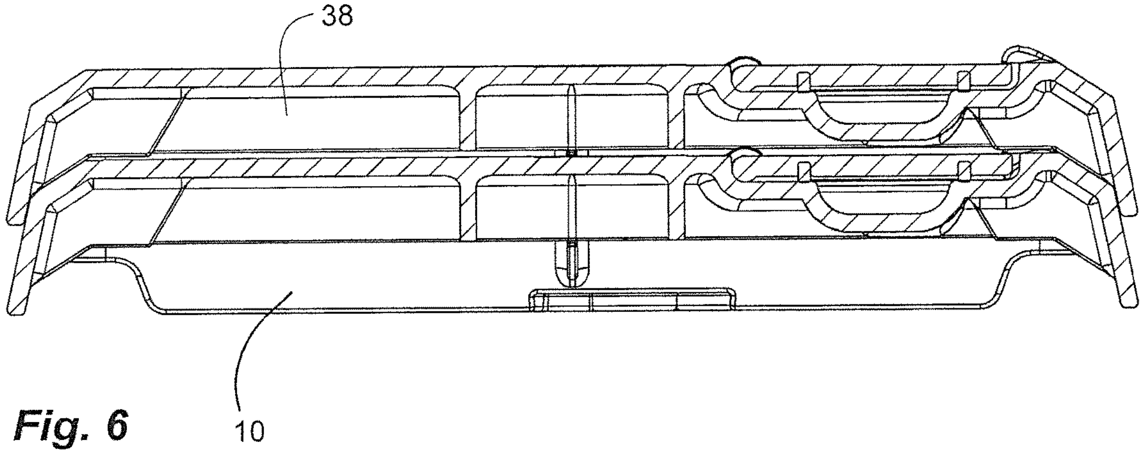
FIG. 6 is a cross-sectional end view of the fluid sample display of FIG. 1, taken along line 4 of FIG. 1, shown in a stacked configuration stacked with an adjacent tray.
Figure 7:
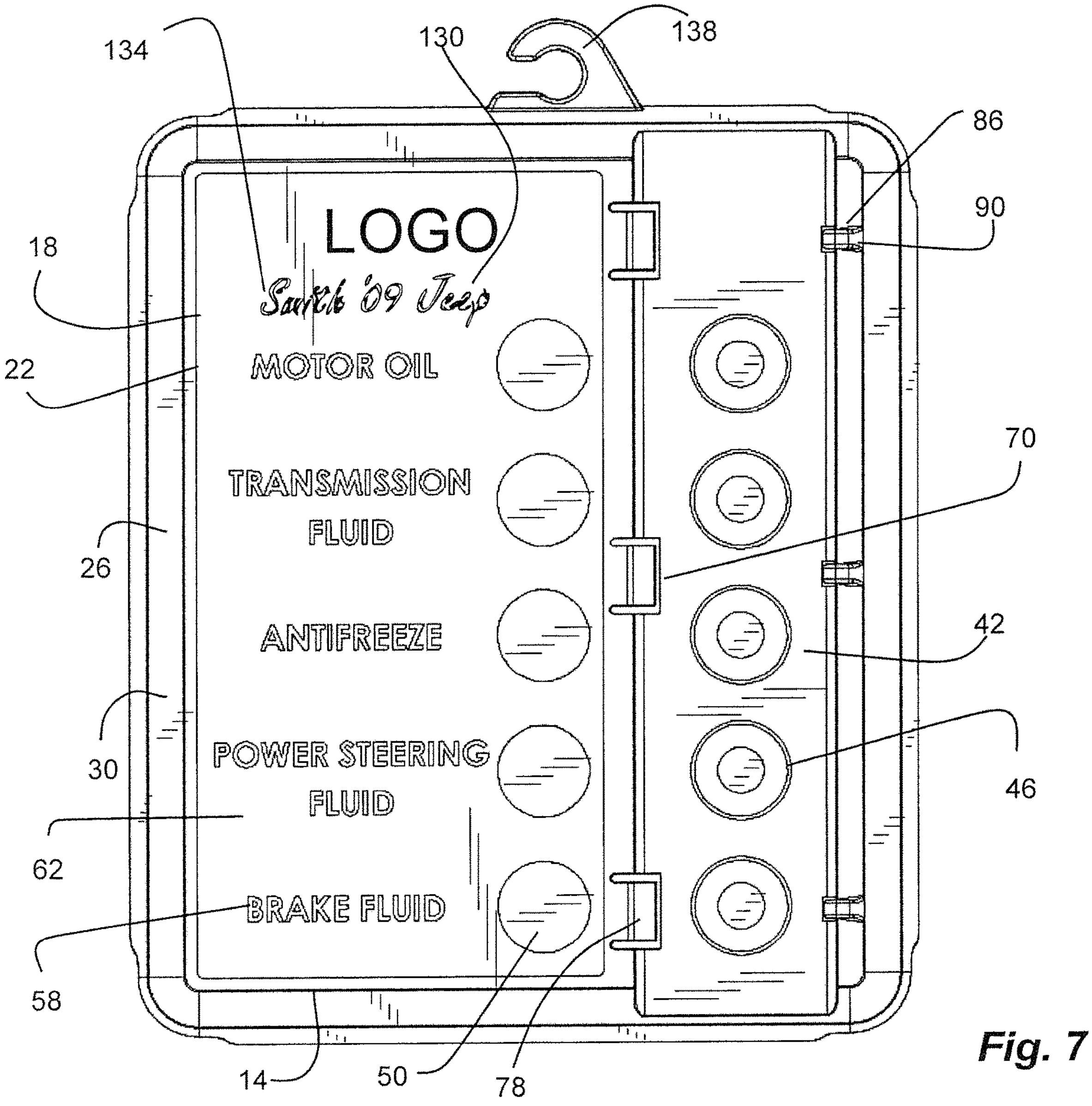
FIG. 7 is a front view of a tray of the fluid sample display of FIG. 1.
Figure 8:
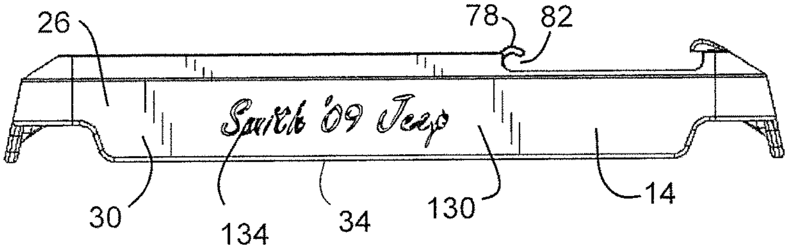
FIG. 8 is an end view of the tray of the fluid sample display of FIG. 1.
Figure 9:
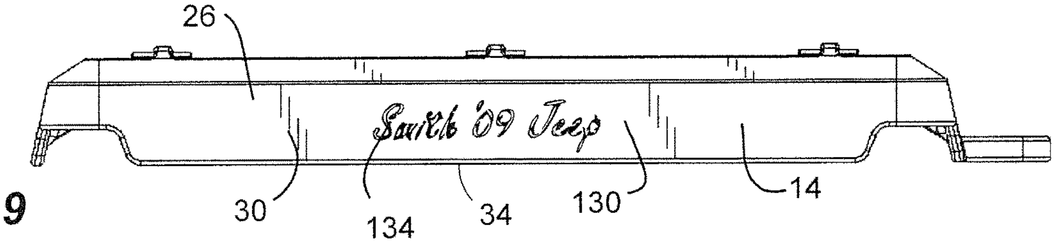
FIG. 9 is a side view of the tray of the fluid sample display of FIG. 1.
Figure 10:
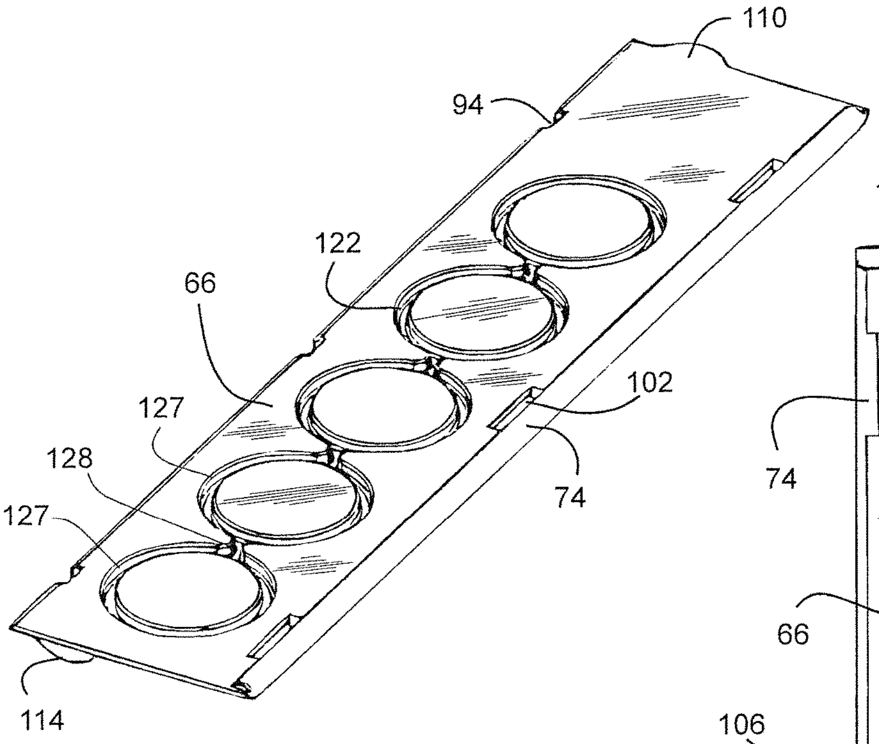
FIG. 10 is a bottom perspective view of the cover of the fluid sample display of FIG.
Figure 11:
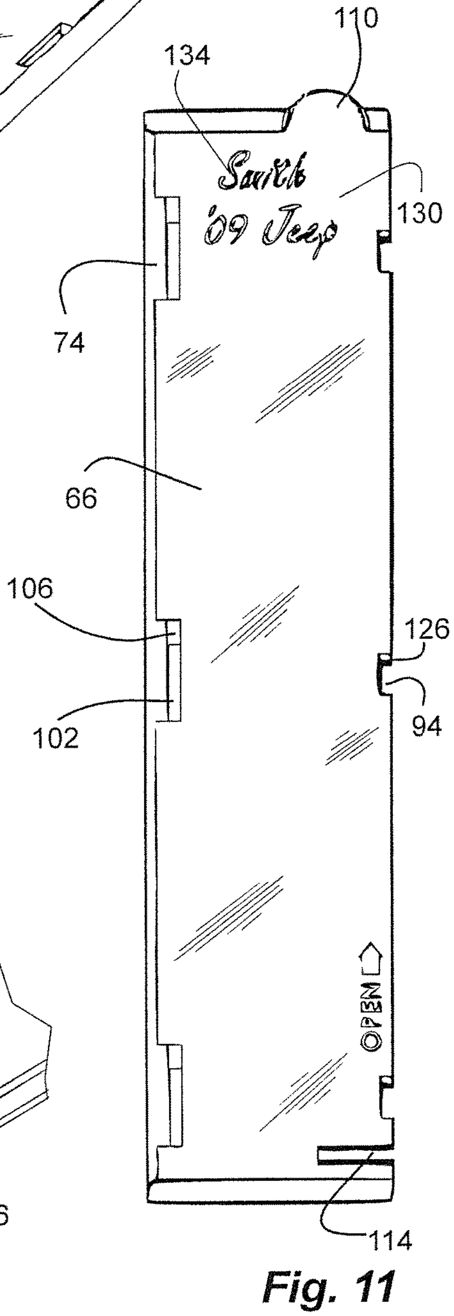
FIG. 11 is a front view of the cover of the fluid sample display of FIG. 1.
Figure 12:
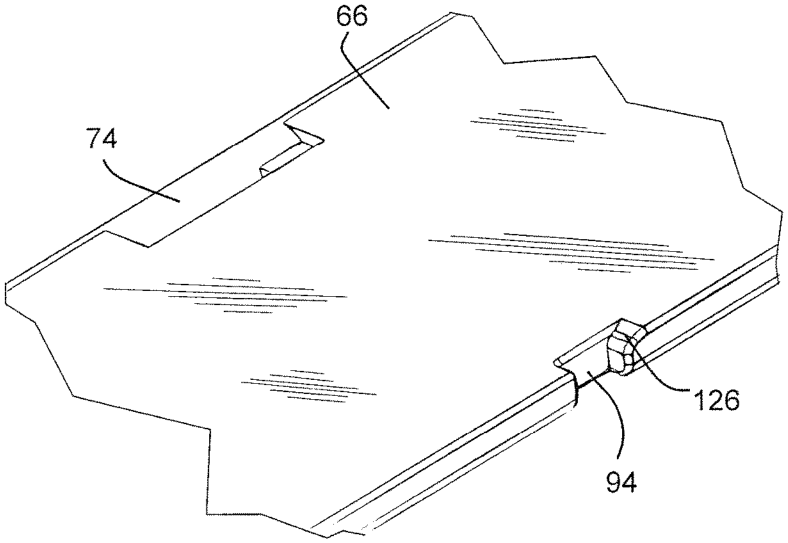
FIG. 12 is a partial top perspective view of the cover of the fluid sample display of FIG. 1.

As illustrated in FIGS. 1-16, a fluid sample display or tray 10 in an exemplary example of the invention is shown. The display 10 comprises a tray 14. The tray 14 can be formed of plastic and can be formed by injection molding or vacuum forming. The tray 14 can be substantially flat, with a length and a width much greater than a thickness. The tray 14 can be sized and shaped to be hand-held. For example, the tray 14 can be sized in the range of 6×8 inches, or 8×10 inches. The tray 14 can have a front or a top 18 with a front surface or a top surface 22 that can be the uppermost surface or portion of the tray 14 when the tray is oriented horizontally, or the outermost surface or portion of the tray 14 when the tray is oriented vertically. In addition, the tray 14 can have a perimeter formed by a perimeter wall 26 with a perimeter surface 30. Furthermore, the tray 14 can have a bottom 34 with a cavity or indentation 38 therein. The tray 14 can be formed by a single, continuous wall forming a shell having a substantially constant thickness throughout the top 18 and the perimeter wall 26. In one aspect, the tray 14 can be opaque. In another aspect, the tray or a portion thereof can be transparent or translucent so that light can be visible therethrough or can pass therethrough to enhance visibility of the fluids. In another aspect, the top 18 of the tray 14 can be narrower and/or smaller than the bottom 34 or the cavity or indentation 38 or opening thereto. The perimeter wall 26 can flare outwardly from the top 18 to the bottom 34. Thus, multiple trays 14 can stacked and nested together as part of a multi-tray system, as shown in FIG. 6, with the top of one tray received within an indentation of an adjacent tray. In one aspect, the tray 14 can have a channel 42 in the top 18 thereof. The channel 42 can extend across the tray 14 from one side to an opposite side. The channel 42 can have one or more open ends open at the opposite sides.

An array of dimples 46 is formed in the tray 14 or in the top 18 thereof. The dimples 46 receive the actual vehicle fluid samples therein. Each dimple can receive a different actual vehicle fluid sample. For example, one dimple can receive motor oil, another dimple can receive transmission fluid, another dimple can receive antifreeze, another dimple can receive steering fluid, another dimple can receive brake fluid, etc. In one aspect, the array of dimples 46 can be linear or straight. In another aspect, the array of dimples 46 can be disposed adjacent or closer to a perimeter side of the tray than to the middle, so that a technician can hold the tray 14 with one hand on a side opposite the array, and fill the dimples 46 with the other hand. The dimples 46 can be indentations or cavities in the top 18 of the tray 14. Thus, the dimples 46 can be open and exposed in the top 18 or top surface 22. The dimples 46 can have a bowl or semi-spherical shape to contain the fluid samples and with a variable depth from an outer perimeter towards the interior to gradually alter the translucency of the fluid and light transmittance therethrough to determine one or more characteristics of the fluid sample. Thus, the outer perimeter of the dimples can have a more shallow depth so that the fluid therein is thinner at the outer perimeter of the dimple to enhance visibility. The variable depth provides variable depth or thickness of the fluid for a full spectrum visible analysis. In one aspect, the dimples 46 can be shallow to increase translucency. In another aspect, the dimples 46 can have a light color (e.g. white) so that the actual fluid samples, and character thereof, can be visible therein. In one example, a material of the tray 14 can have or provide the light or white color. In another example, the light color or white color can be painted or printed in the dimples 46. In another aspect, the dimples 46 or a portion thereof, or the tray 14, can be transparent or translucent to allow light through the dimples 46, the tray 14 and the actual fluid samples to facilitate viewing. In another aspect, the dimples 14 can be located in the channel 42, and can be formed in a bottom of the channel 42.

An array of comparisons 50 is disposed on or carried by the tray 14 adjacent the array of dimples 46. Each dimple 46 is paired with a corresponding comparison 50. Each comparison 50 comprises a representation of an exemplary fluid, e.g. a clean and/or new fluid. In one aspect, the comparison 50 or representation can comprise a picture, such as a photograph, of the exemplary fluid. In another aspect, the comparison 50 or representation can comprise an actual sample of the exemplary fluid. For example, the sample can be sealed in a capsule, and affixed to the tray. The capsule can reside in an aperture in the tray to allow light to pass through the sample. As another example, the sample can be disposed in another dimple and covered and sealed by a cover, or a window or a lens, as discussed in greater detail below.

Vehicle fluid indicia 58, such as text and/or symbols, can be positioned on the tray 14, or the top surface 22 thereof, and adjacent the comparisons 50 and corresponding to the dimples 46 with each vehicle fluid indicium 58 indicating which comparison 50 is represented and which vehicle fluid is to be received in each dimple 46. In one aspect, a label 62 can be applied to the top 18 or the top surface 22 of the tray 14. The label 62 can be applied with adhesive. The label 62 can comprise indicia including the comparisons 50 (e.g. an array of pictures of the exemplary fluids) and the vehicle fluid indicia 58. Again, the comparisons 50 and the vehicle fluid indicia 58 can correspond to the dimples 46 with each vehicle fluid indicium 58 indicating which vehicle fluid is to be received in each dimple 46, and which comparison 50 is shown adjacent to a corresponding dimple 46. In another aspect, the vehicle fluid indicia 58 can be molded into the top surface 22 of the top 18 of the tray 14.

Figure 1:
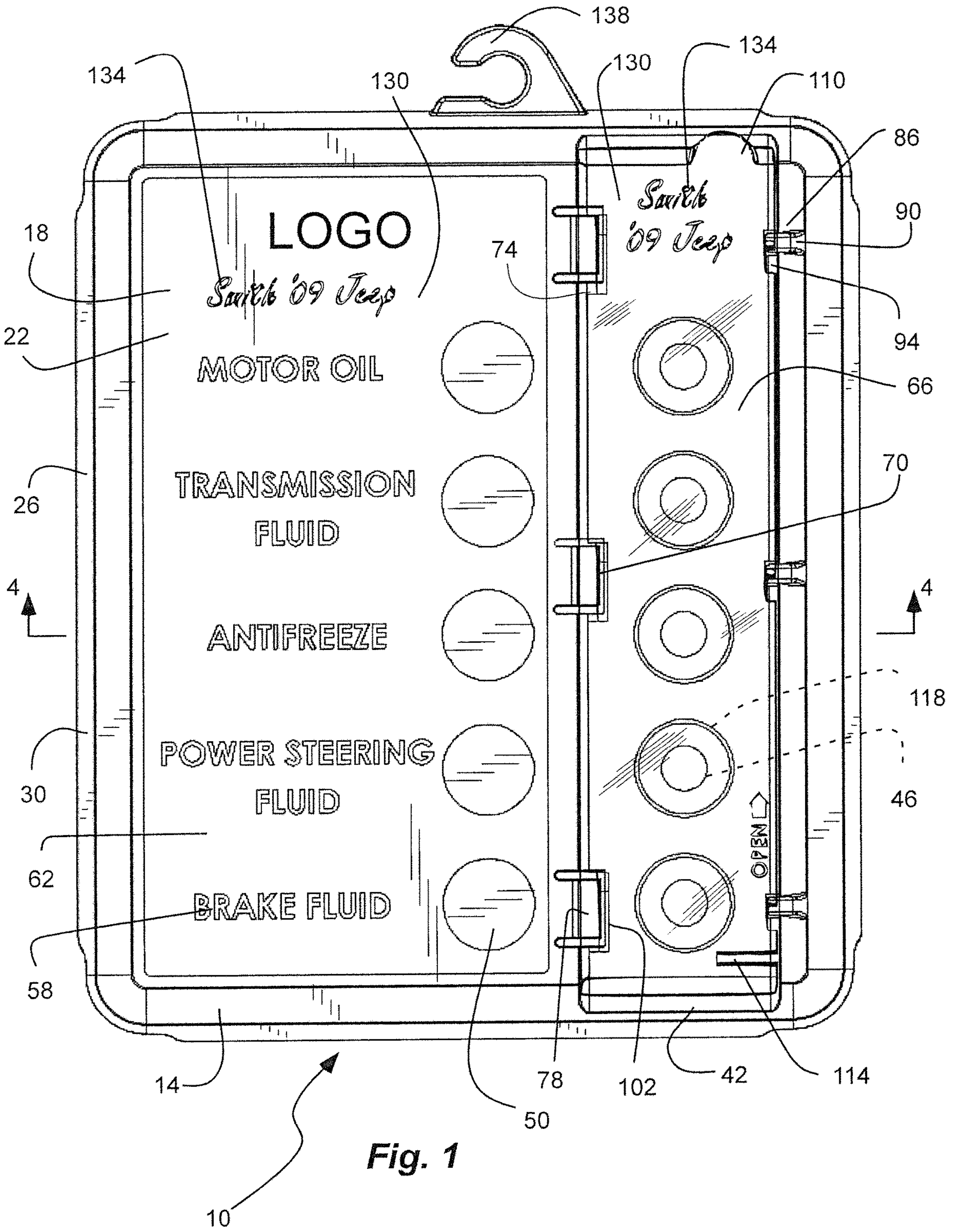
FIG. 1 is a front view of a fluid sample display for displaying and comparing actual vehicle fluid samples with exemplary fluid conditions in accordance with an embodiment of the present invention.
Figure 2:
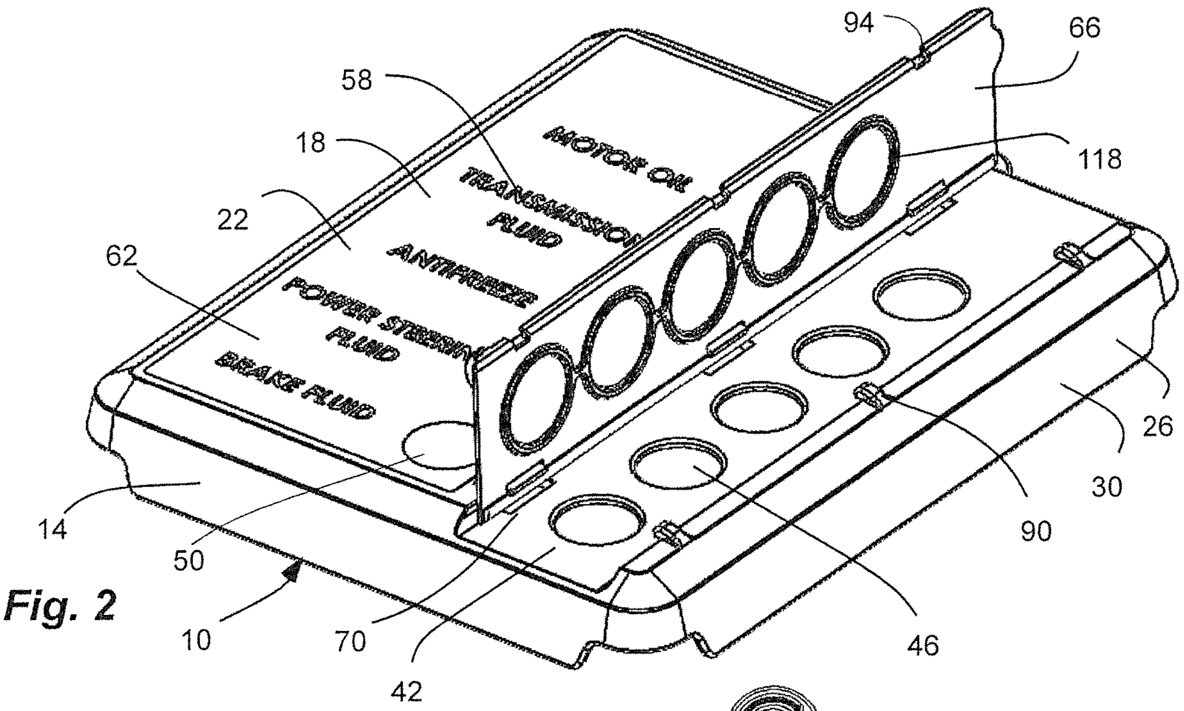
FIG. 2 is a perspective view of the fluid sample display of FIG. 1, shown with a cover in an open position.
Figure 3:
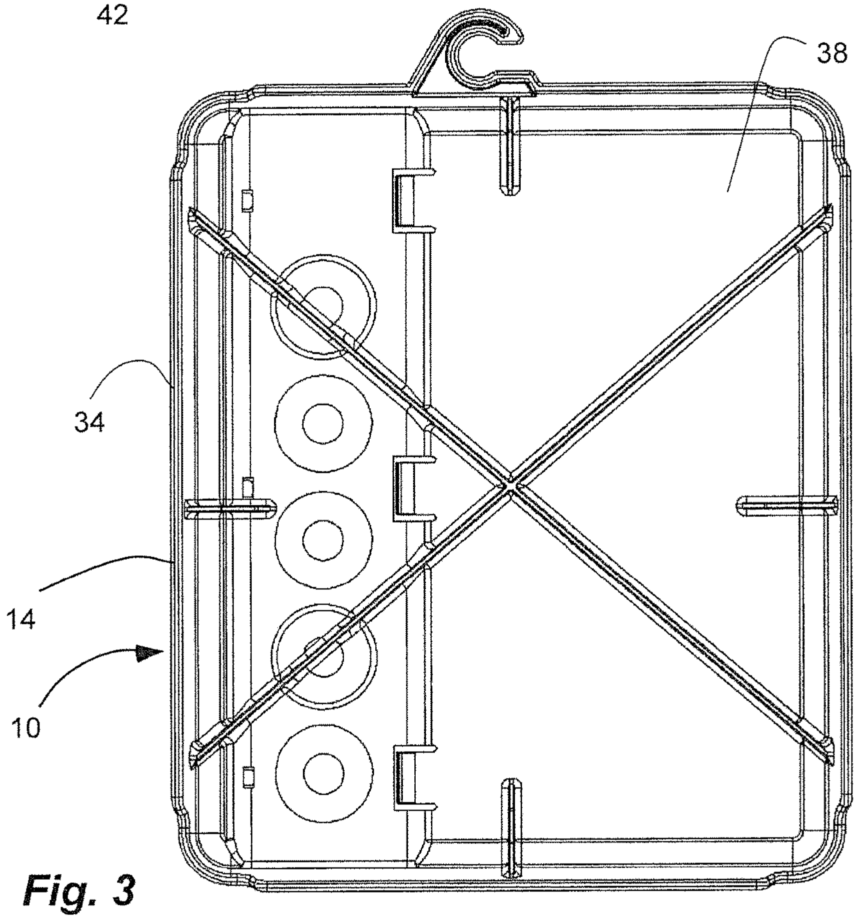
FIG. 3 is a rear view of the fluid sample display of FIG. 1.
Figure 4:
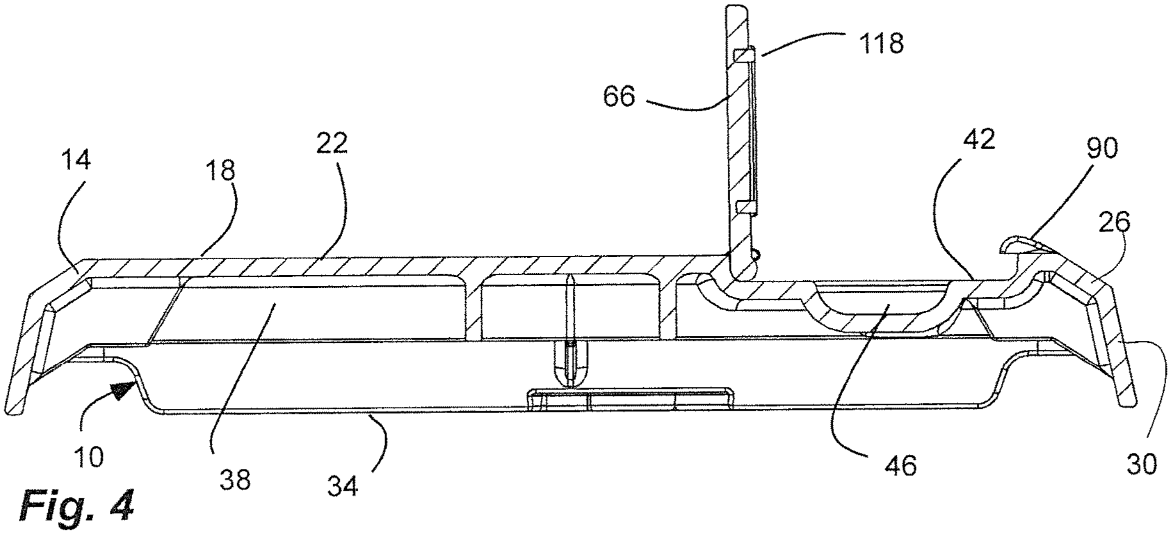
FIG. 4 is a cross-sectional end view of the fluid sample display of FIG. 1, taken along line 4 of FIG. 1, shown with the cover in the open position.

A cover 66 is carried by the tray 14, and removably covers the array of dimples 46. The cover 66 can be formed of plastic and can be formed by injection molding. The cover 66 can seal and/or contain the actual fluid samples in the dimples 46 to resist spillage and/or cross-contamination. In one aspect, a seal can be formed between the cover 66 and the tray 14, and around the dimples 46, to seal the dimples 46, as discussed in greater detail below. The cover 66 can move, pivot and/or slide with respect to the tray 14 and the dimples 46 to allow the dimples to be filled and covered. The cover 66 can have at least two positions, including a closed position and an open position. In the closed position, as shown in FIGS. 1 and 5, the cover 66 is disposed over the array of dimples 46, and against the tray 14. In the open position, as shown in FIGS. 2 and 4, the cover 66 is disposed away from the array of dimples 46.

In one aspect, the cover 66 can be movably or removably disposed in the channel 42. In the closed position, the cover 66 can be received or substantially received in the channel 42. An upper or outer surface of the cover 66 can be substantially flush with the upper surface 22 of the top 18 of the tray 14 in the closed position. Thus, trays 14 can be stacked together without interference from the cover 66, as shown in FIG. 6.

In one aspect, the cover 66, or at least a portion thereof that is positionable over the dimples 46 in the closed configuration, can be transparent so that the actual vehicle fluid samples can be viewed through the cover 66, or the transparent portion thereof, when the cover 66 is closed. In another aspect, the cover 66 itself can be a transparent window or panel. In another aspect, the cover 66 or portions thereof can have optical magnification, such as a cylindrical lens or multiple circular lenses formed therein, disposed over the dimples 46, to magnify the fluid and facilitate observance of inclusions or particulates or pollutants.

The cover 66 can be pivotally coupled to the tray 14, and the cover 66 can pivot between the open and the closed positions. A hinge 70 can be formed or positioned between the cover 66 and the tray 14, with the cover 66 pivotally coupled to the tray 14 by the hinge 70. The hinge 70 can be a single hinge or multiple hinge portions. The hinge 70 can comprise an axle 74 carried by the cover 66. The axle 74 can be formed along a side of the cover 66, or at one or more discrete locations along the side of the cover. In addition, the hinge 70 can comprise a finger 78 extending from the tray 14 and forming a gap 82 between the finger 78 and the tray. The finger 78 and the tray 14 or channel 46 opposing the finger 78 can be or can form a segmented collar to receive the axle 74. The finger 78 can be a single finger or multiple fingers corresponding to multiple axle segments. The fingers 78 can extend from an edge or side of the channel 42, and out and over the channel 42 so that the gap 82 is formed between the finger 78 and the bottom of the channel 42.

Figure 13A:
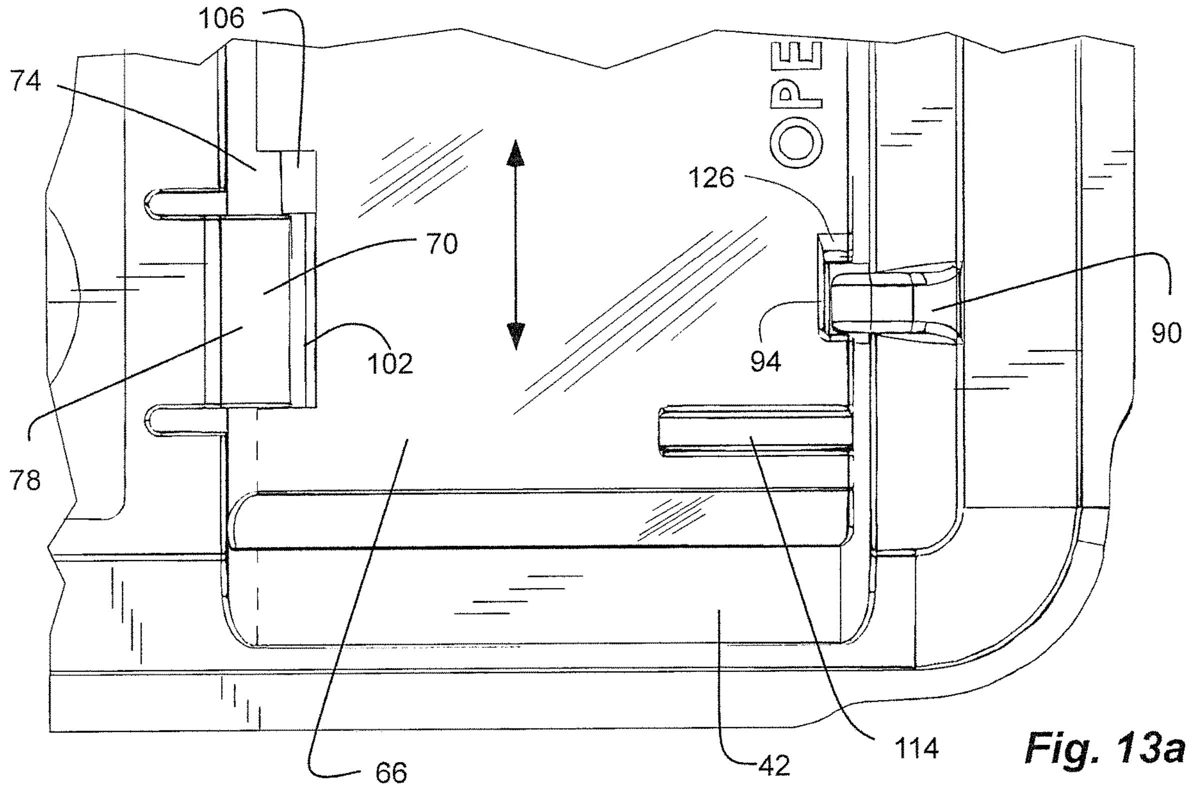
FIG. 13*a* is a partial top view of the fluid sample display of FIG. 1, shown with the cover in an unlocked position.
Figure 13B:
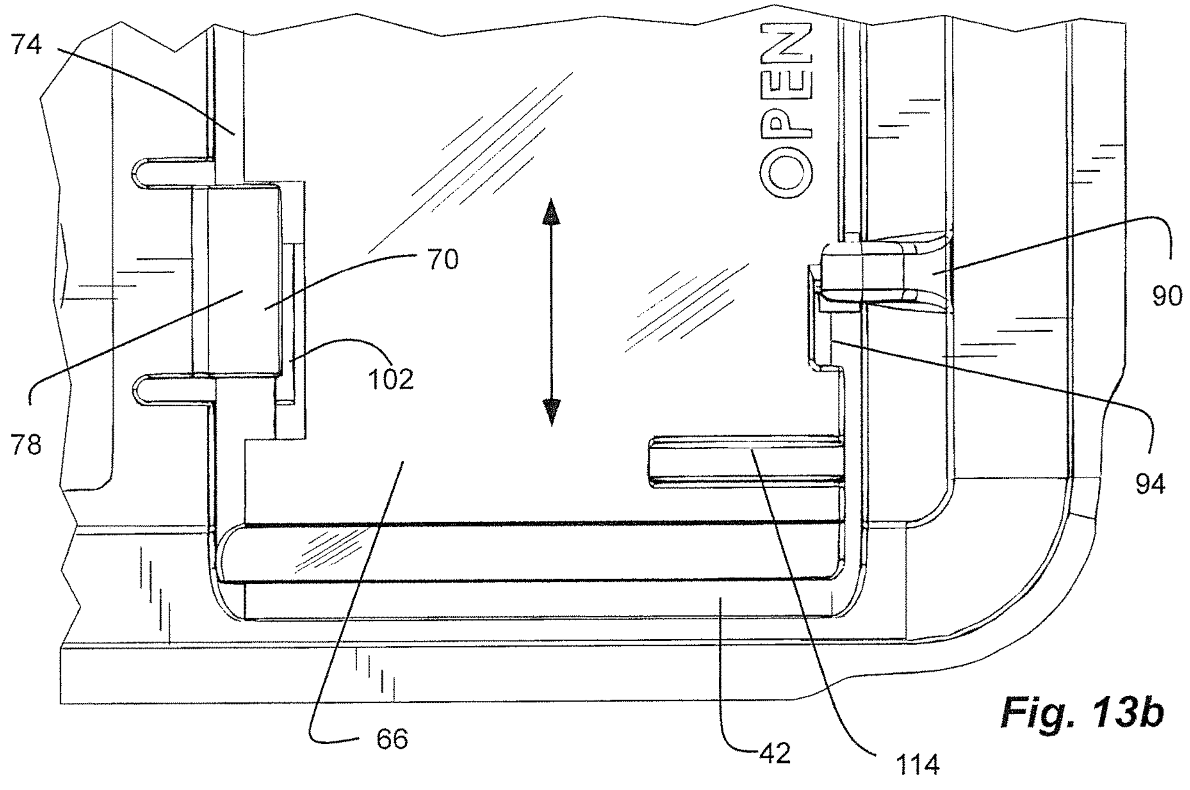
FIG. 13*b* is a partial top view of the fluid sample display of FIG. 1, shown with the cover in a locked position.

The cover 66 can also be locked into position to resist inadvertent opening of the cover 66, and thus avoid inadvertent spillage and/or cross-contamination of the actual fluid samples. The fluid sample display 10, or the tray 14 and the cover 66, can have a lock 86. The cover 66 can slide between a locked position and an unlocked position, while in the closed position. Thus, the cover 66 can be slidable in the closed orientation between the unlocked position and the locked position. The lock 86 can comprise a locking tab 90 extending from the tray 14 opposite the hinge 70. The locking tab 90 can extend from the edge or side of the channel 42, and out and over the channel 42, and thus the cover 66 or edge thereof in the closed position. The locking tab 90 can comprise a single locking tab or multiple locking tabs. A corresponding notch 94 can be formed in the cover 66 opposite the hinge 70, and alignable with the locking tab 90 as the cover 66 pivots between the open position and the closed position. The notch 94 can comprise a single notch corresponding to a single locking tab, or multiple notches corresponding to multiple locking tabs. In the locked position, a portion or edge of the cover 66 can be positioned under the locking tab 90 of the lock 86, or between the locking tab 90 and the tray 14 or channel 42. Thus, the cover 66 can pivot to the closed position with the lock tab 90 passing through or into the notch 94, as shown in FIG. 13*a*, and then the cover 66 can be slid with the notch 94 of the cover 66 sliding past the locking tab 90 so that the locking tab 90 is positioned over the cover 66 or edge thereof, as shown in FIG. 13*b*, to resist the cover 66 from pivoting to the open position. In the unlocked position, the notch 94 of the cover 66 is aligned with the locking tab 90 of the tray 14 or the lock 86. In the locked position, the notch 94 of the cover 66 is mis-aligned with respect to the locking tab 90 of the tray 14 or the lock 86. In addition, in the locked position, a portion of the cover 66 adjacent the notch 94 is disposed between the locking tab 90 and the tray 14.

Figure 14A:
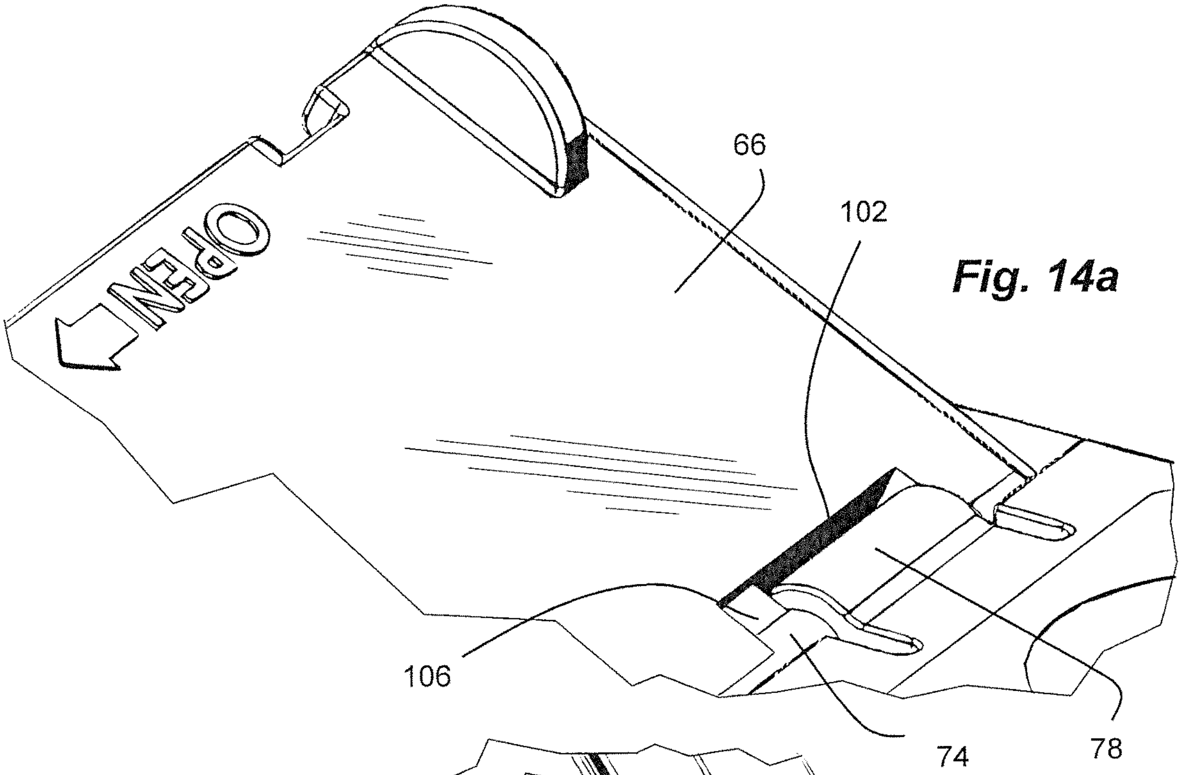
FIG. 14*a* is a partial top perspective view of the fluid sample display of FIG. 1, shown with the cover in the open position.
Figure 14B:
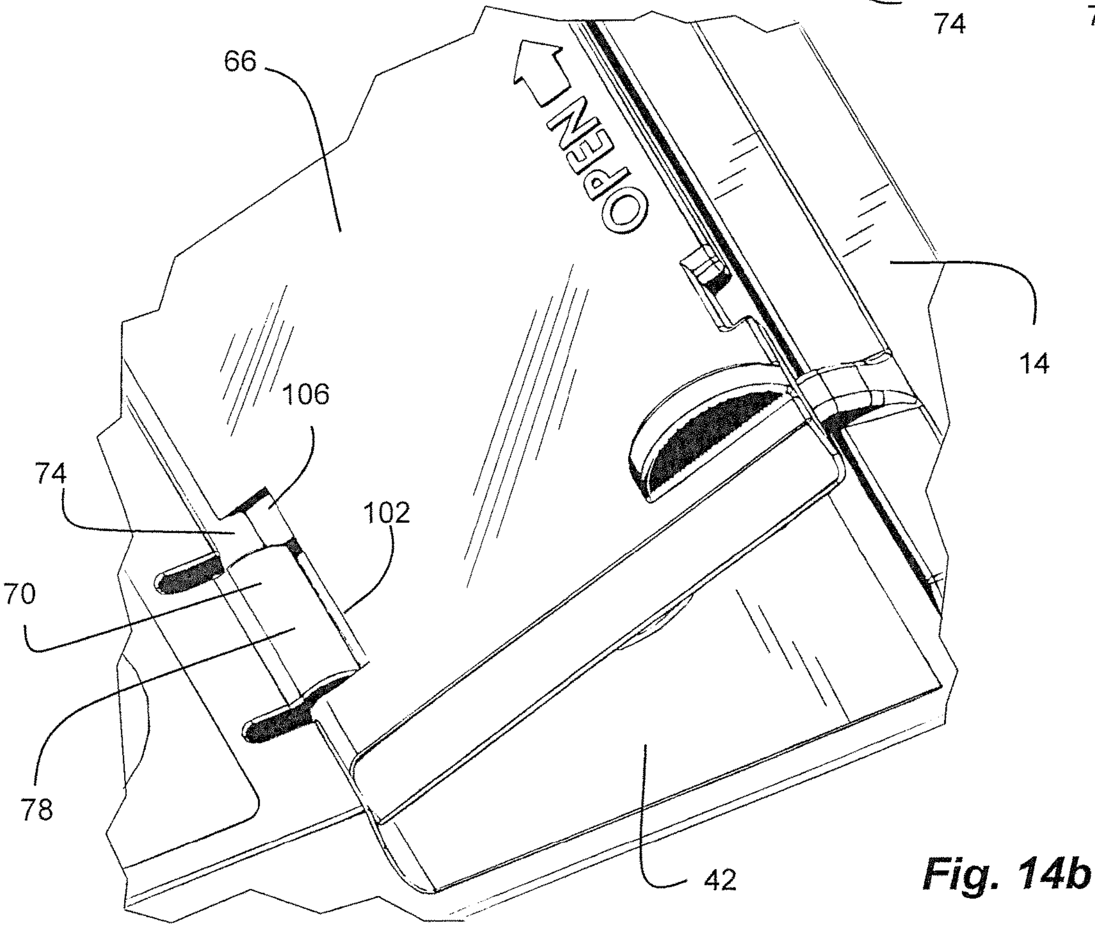
FIG. 14*b* is a partial top perspective view of the fluid sample display of FIG. 1, shown with the cover in the open position.
Figure 15:
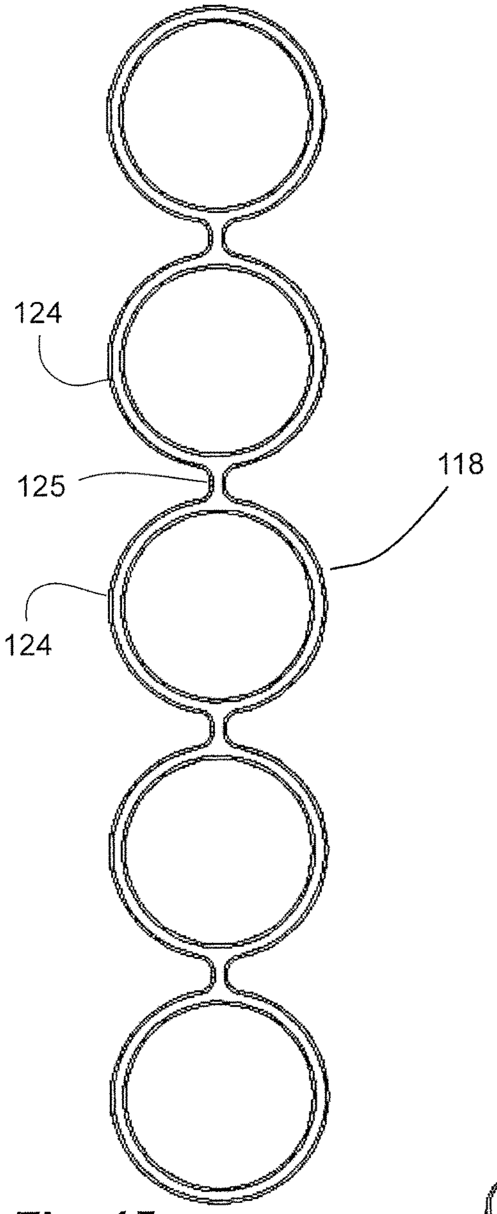
FIG. 15 is a top view of a seal of the fluid sample display of FIG. 1.
Figure 16:
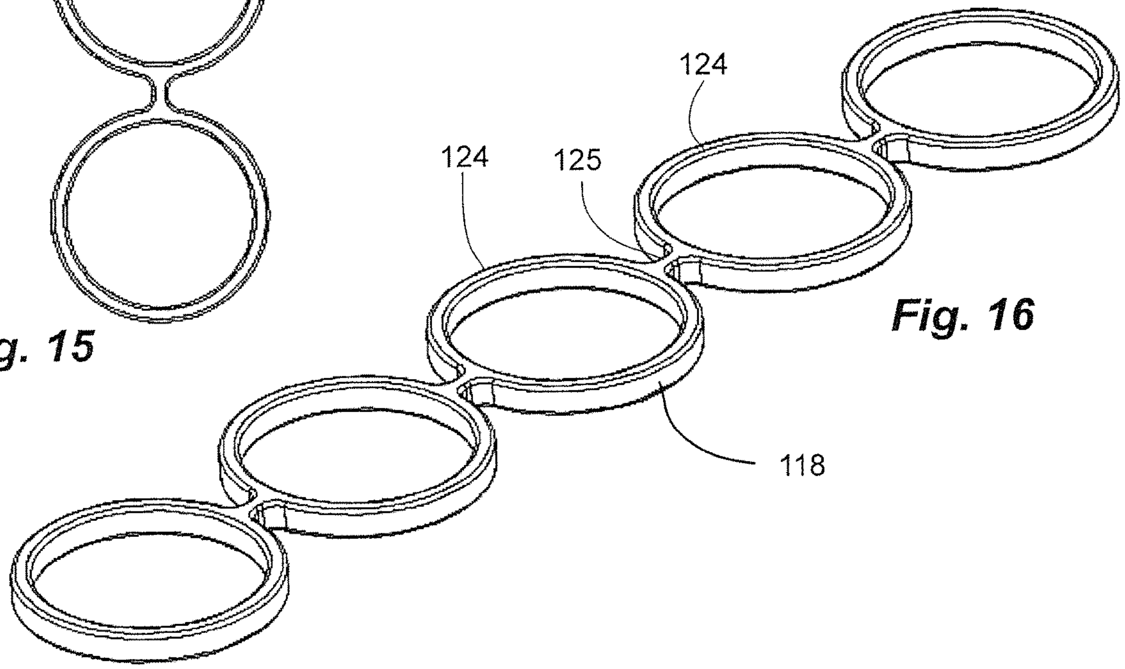
FIG. 16 is a perspective view of the fluid sample display of FIG. 1.

In addition, the hinge 70 can be configured to resist the cover 66 from sliding in the open position, and thus having the notch 94 become mis-aligned with the locking tab 90 when the cover 66 is in the open position. The hinge 70 or the cover 66 can have a slot 102 in the cover 66 adjacent to the axle 74 and a distal end of the finger 78. The slot 102 receives the finger 78 of the tray 14 or the hinge 70 as the cover 66 pivots between the open and closed positions. In addition, a stop 106 can be positioned in the slot 102 of the cover 66 or the hinge 70. The stop 106 can have a thickness less than a thickness of the gap 82 so that the stop 106 slides in the gap 82 as the cover 66 slides between the locked and unlocked positions while in the closed position. But in the open position, the stop 106 abuts to the finger 78 of the tray 14 or the hinge 70 to resist the cover 66 from sliding with respect to the tray 14 in the open position, as shown in FIGS. 14*a* and 14*b*.

The cover 66 can also have finger tabs to assist in pivoting and/or sliding the cover 66 between the open and closed positions, and between the locked and unlocked positions. A first finger tab 110 can extend from the cover 66, and beyond a lateral perimeter of the tray 14 when the cover 66 is in the closed position and the unlocked position. The first finger tab 110 can define a pivot tab to pivot the cover 66 between the open and closed positions. A second finger tab 114 can extend from the cover 66 perpendicularly to the first finger tab 110, and beyond the top 18 of the tray 14 when the cover 66 is in the closed position. The second finger tab 114 can define a locking tab to slide the cover 66 between the unlocked and locked positions.

As stated above, the fluid sample display 10, or the tray 14 and the cover 66, can have a seal 118 between the cover 66 and the tray 14 or the channel 42, and circumscribing the dimples 46 when the cover 66 is in the closed position. The seal 118 can be a single seal sealing all of the dimples, or multiple seals each paired with and sealing a different dimple. In one aspect, the seal 118 can be carried by the cover 66. A channel 122 can be formed in the cover 66 to receive the seal 118. In one aspect, the seal 118 can comprise multiple annular seals 124 interconnected together in series by attachment arms 125. Similarly, the channel 122 can be multiple annular channels 127 interconnected together in series by attachment channels 128. In one aspect, the seal 118 and the cover 66 can be co-molded with the seal 118 formed separately and the cover 66 molded around the seal 118. Thus, the seal 118 can be retained in the channel 122 of the cover 66, and the formation of gaps between the seal 118 and the channel 122 are resisted to resist accumulation of fluid therein. The seal 118 resists the actual vehicle sample fluid from leaking from the dimples 46, and allows the fluid sample display 10 and the tray 14 to be held in a more natural and convenient orientation, such as at an acute inclined with respect to horizontal. In one aspect, a portion of the cover 66 adjacent to the notch 94 can be ramped or inclined to have a ramp or incline 126 to abut to the locking tab 90 as the cover 66, and thus the ramp or incline 126, slides from the unlocked to the locked position, to push the cover 66 towards the tray 14, and compress the seal 118. In another aspect, a seal can be carried by the tray, such as by being disposed in a channel in the tray.

Furthermore, the fluid sample display 10, the tray 14 and/or the cover 66 can have an indicia panel 130 to receive removable indicia 134 thereon. The removable indicia 134 can be indicative of a vehicle from which the actual vehicle fluid samples were received, and/or an owner of the vehicle. Thus, the fluid sample display 10 can be distinguished from other fluid sample displays with fluid samples from other vehicles and/or owners. In one aspect, the panel 130 can be a flat area on the tray 14, such as on the top surface 18, and/or perimeter wall 26. The indicia 134 can be removably disposed on the indicia panel 130. In one aspect, the indicia 134 can be formed with a dry-erase pen or grease pen. In one aspect, the indicia panel 130 can be formed by a white-board material, affixed to the tray 14 or the cover 66, and the indicia 134 can be formed by a dry-erase pen. In another aspect, the indicia panel 130 can be slate or chalk-board material, and the indicia 134 can be formed by chalk. In another aspect, the indicia panel 130 can be a clear area on the tray 14 or the cover 66, and the indicia 134 can be formed by a printed label adhered to the clear area. The indicia panel 134 can be separate from the dimples 46, comparisons 50, and/or the indicia 58 associated with the comparisons to avoid interference.

In one aspect, the fluid sample display 10 and/or the tray 14 can have a hanger 138 from which the tray 14 and/or the display 10 can be suspended. In another aspect, multiple displays 10 can be stacked together with adjacent trays on a horizontal support surface, as shown in FIG. 6, with the top 18 of one tray 14 nesting in an indentation 38 of an adjacent tray 14.

A method for displaying and comparing actual vehicle fluid samples with exemplary fluid conditions, and for using the fluid sample display 10 described above, can comprise:

a) disposing identifying indicia 134 on an indicia panel 130 of a tray 14, cover 66 and/or display 10, with the identifying indicia 134 being indicative of a vehicle and/or owner of the vehicle;

b) moving or pivoting the cover 66 to an open position, and/or moving or sliding the cover 66 to an unlocked position;

c) taking actual vehicle fluid samples from the vehicle;

d) disposing each of the actual vehicle fluid samples in a different one of the plurality of dimples 46 in the tray 14;

e) covering the actual vehicle fluid samples and the dimples 46 with the cover 66, such as by moving or pivoting the cover 66 to closed position, and/or moving or sliding the cover 66 to the locked position;

f) observing the actual vehicle fluid samples in the dimples 46 with respect to the corresponding representation or comparison 50 of an exemplary fluid; and/or g) showing the actual vehicle fluid samples in the dimples 46 with the corresponding comparison 50 of the exemplary fluid to the owner of the vehicle.

The method need not be performed in a particular order, unless otherwise specified, and not all steps need not be performed, unless otherwise specified.

Figure 17:
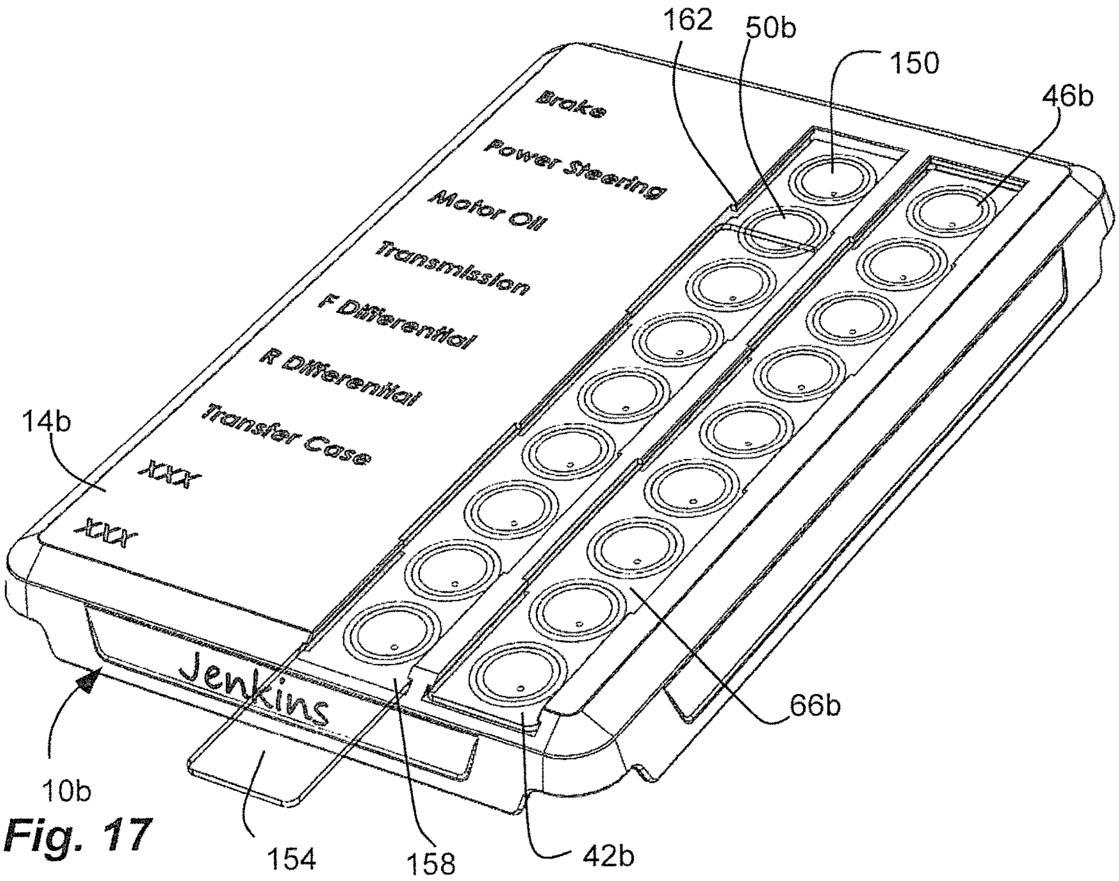
FIG. 17 is a perspective view of another fluid sample display in accordance with another embodiment of the present invention.

Referring to FIG. 17, another fluid sample display **10*b* is shown that is similar in many respects to that described above, and which description is hereby incorporated herein by reference. The display 10*b* has a tray 14*b* with a second array of dimples 150 for receiving actual exemplary fluids therein to form the comparisons 50*b*. Thus, a user can provide the display 10*b* with their own representations of exemplary fluids. In addition, a first array of dimples 46*b* for receiving actual vehicle fluid samples, and the second array of dimples 150, can be covered by first and second covers 66*b* and 154, respectively. In one aspect, the first and second arrays of dimples 46*b* and 150 can be disposed in first and second channels 42*b* and 158. The channels can have lips 162 extending over the channels, and the covers 66*b* and 154 can be slid over the dimples 46*b* and 150. The dimples 46*b* and 150 can be sealed by o-rings or seals received in annular channels surrounding the dimples 46*b* and 150 in the tray 14*b* or the channels 42*b* and 158**.

Figure 18:
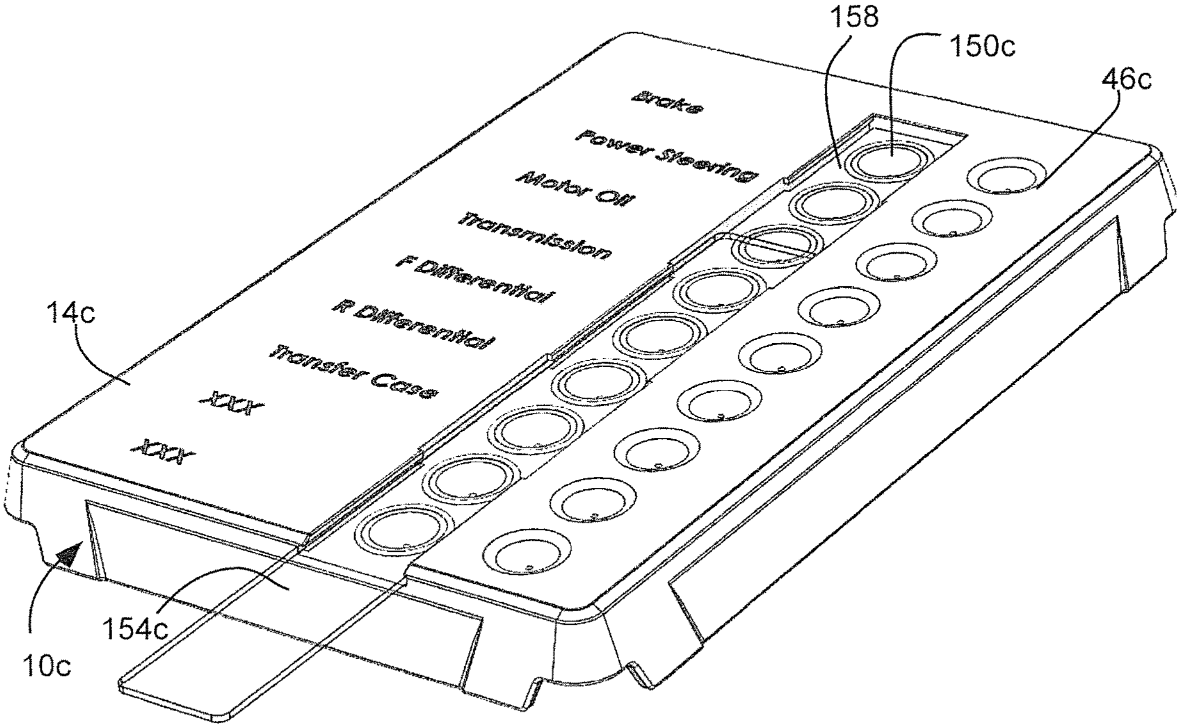
FIG. 18 is a perspective view of another fluid sample display in accordance with another embodiment of the present invention.

Referring to FIG. 18, another fluid sample display **10*c* is shown that is similar in many respects to those described above, and which description is hereby incorporated herein by reference. Again, the display 10*c* has a tray 14*c* with first and second arrays of dimples 46*c* and 150*c*, and one or more slidable covers 154*c*. In one aspect, the second array of dimples 150*c* can be used to hold actual exemplary fluids, while the first array of dimples 46*c* can receive actual vehicle fluid samples. The arrays of dimples 46*c* and 150*c* can be disposed adjacent one another for ease of comparison. In another example, the first array of dimples 46*c* can hold actual exemplary fluids, while the second array of dimples 150*c*** can receive actual vehicle fluid samples.

Figure 19:
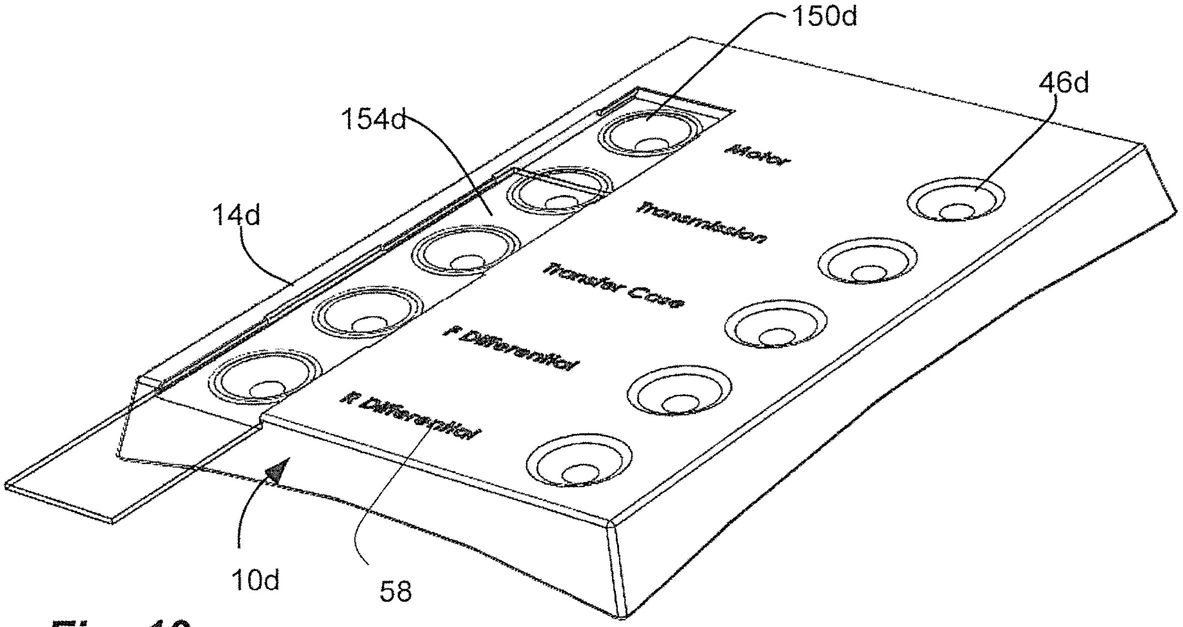
FIG. 19 is a perspective view of another fluid sample display in accordance with another embodiment of the present invention.

Referring to FIG. 19, another fluid sample display **10*d* is shown that is similar in many respects to those described above, and which description is hereby incorporated herein by reference. Again, the display 10*d* has a tray 14*d* with first and second arrays of dimples 46*d* and 150*d*, and one or more slidable covers 154*d*. Again, the second array of dimples 150*d* can be used to hold actual exemplary fluids, while the first array of dimples 66*d* can receive actual vehicle fluid samples. The arrays of dimples 66*d* and 150*d* can be disposed opposite one another with the indicia 58 therebetween. In another example, the first array of dimples 46*d* can hold actual exemplary fluids, while the second array of dimples 150*d*** can receive actual vehicle fluid samples.

Figure 20:
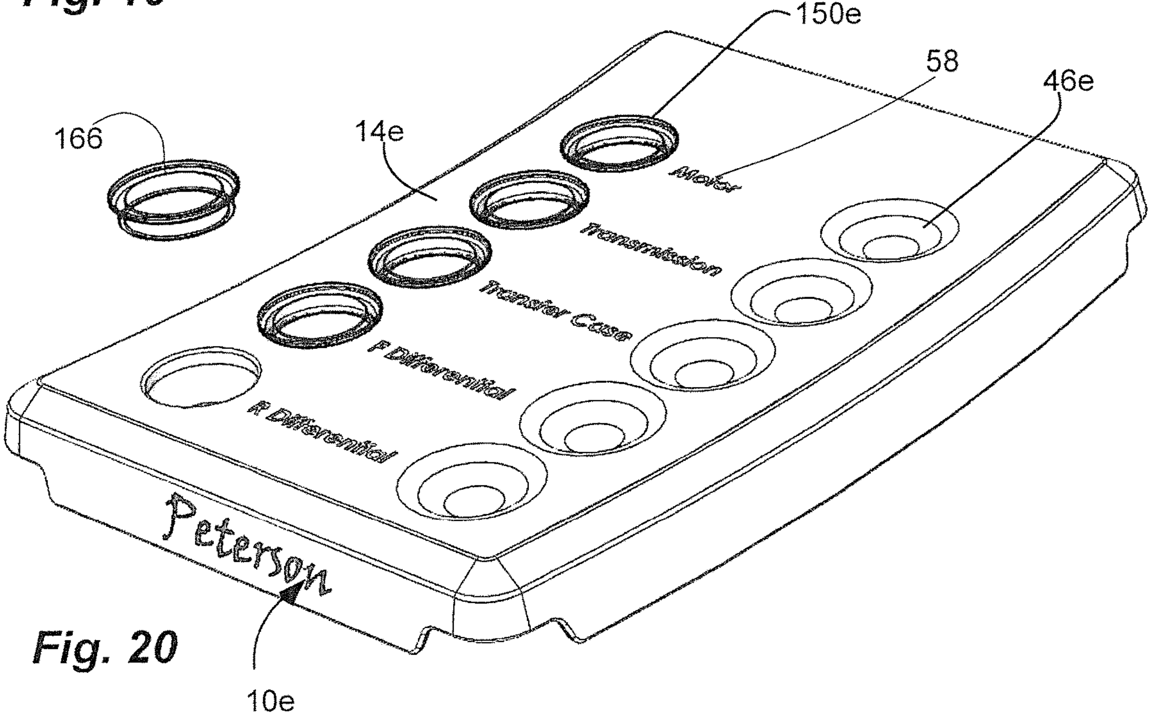
FIG. 20 is an exploded perspective view of another fluid sample display in accordance with another embodiment of the present invention.
Figure 21:
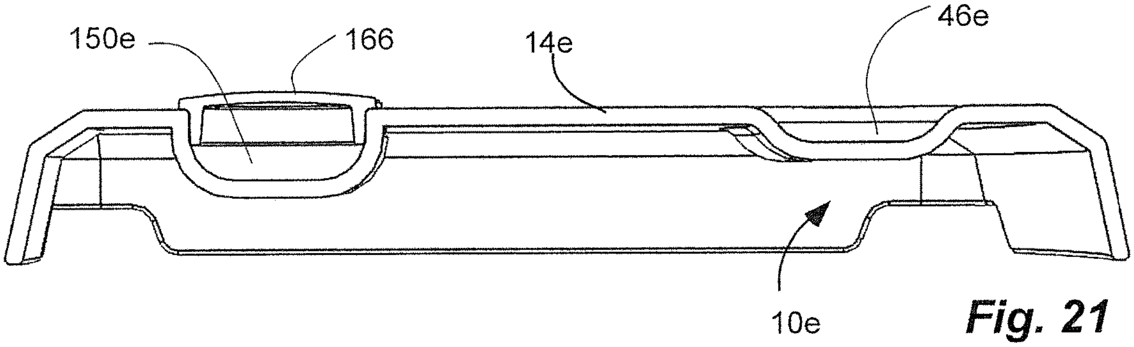
FIG. 21 is a cross-sectional end view of the fluid sample display of FIG. 20.

Referring to FIGS. 20 and 21, another fluid sample display **10*e* is shown that is similar in many respects to those described above, and which description is hereby incorporated herein by reference. The display 10*e* has a tray 14*e* with first and second arrays of dimples 46*e* and 150*e*. The second dimples 150*e* can have multiple separate and distinct covers 166. The covers 166 can be formed as caps with a head having a window and an annular ring extending therefrom. In one aspect, the covers 166 can be removably disposed on the dimples 150*e* or the tray 14*e*, such as with threaded couplings, press fit couplings, etc. The annular ring can extend into the dimples. In another aspect, the covers 166 can be permanently affixed to the dimples 150*e* or the tray 14*e*, such as with adhesive, sonic welding, etc. In another aspect, the first dimples 46*e*** can similarly have multiple separate and distinct covers.

Aspects of any subsequent embodiment are equally applicable to any previous embodiment.

In another aspect, the exemplary fluid samples can be actual exemplary fluids sealed in a vessel or capsule that is affixed to the tray. The vessels or capsules can be disposed in dimples or apertures.

In another aspect, the fluid sample display can comprise a pair of displays with one used for upper fluids from an upper portion of the vehicle and another used for lower fluids from underneath the vehicle. The displays or trays can be removably coupled together.

In accordance with another aspect, the tray can have an area to receive indicia, such as a logo, indicative of a business, such as the service shop.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A fluid sample display configured for displaying and comparing actual vehicle fluid samples with exemplary fluid conditions, the fluid sample display comprising:

a) a tray;

b) an array of dimples formed in the tray configured to receive the actual vehicle fluid samples;

c) an array of comparisons disposed on the tray adjacent the array of dimples, with each dimple paired with a corresponding comparison, each comparison comprising a representation of an exemplary fluid;

d) a cover carried by the tray and removably covering the array of dimples;

e) a hinge between the cover and the tray with the cover pivotally coupled to the tray by the hinge;

f) the cover pivoting between a closed position in which the cover is disposed over the array of dimples and against the tray, and an on position in which the cover is disposed away from the array of dimples;

g) a locking tab extending front the tray opposite the hinge;

h) a notch in the cover opposite the hinge and alignable with the locking tab as the cover pivots between the open and closed positions; and i) the cover being slidable with respect to the tray in the closed position between an unlocked position in which the notch of the cover is aligned with the locking tab of the tray, and a locked position in which the notch of the cover is mis-aligned with respect to the locking tab of the tray and a portion of the cover adjacent the notch is disposed between the locking tab and the tray.

2. The fluid sample display in accordance with claim 1, wherein the cover has at least a portion that is transparent disposable over the array of dimples configured to view the actual vehicle fluid samples therethrough.

3. The fluid sample display in accordance with claim 1, further comprising:

an indicia panel on the tray configured to receive removable indicia thereon indicative of a vehicle from which the actual vehicle fluid samples were received, or an owner of the vehicle, or both.

4. The fluid sample display in accordance with claim 1, wherein the hinge comprises:

an axle carried by the cover; and a finger extending from the tray and forming a gap between the finger and the tray to receive the axle; and wherein the cover further comprises:

a slot in the cover adjacent the axle to receive the finger of the tray as the cover pivots between the open and closed positions; and a stop in the slot of the cover having a thickness less than a thickness of the gap such that the stop slides in the gap as the cover slides between the locked and unlocked positions, but abuts to the finger when the cover is in the open position to resist the cover from sliding with respect to the tray in the open position.

5. The fluid sample display in accordance with claim 1, further comprising:

a first finger tab extending from the cover and beyond a lateral perimeter of the tray when the cover is in the closed position and the unlocked position, defining a pivot tab to pivot the cover between the open and closed orientations; and a second finger tab extending from the cover perpendicularly to the first finger tab and beyond a top of the tray when the cover is in the closed position, defining a locking tab to slide the cover between the unlocked and locked positions.

6. The fluid sample display in accordance with claim 1, further comprising:

a channel in a top of the tray with the array of dimples disposed in the channel and the cover slidably disposed in the channel in the closed position.

7. The fluid sample display in accordance with claim 1, further comprising:

at least one seal carried by the cover and circumscribing the array of dimples when the cover is in the closed position.

8. The fluid sample display in accordance with claim 1, wherein the tray has a top with a narrower size, a perimeter wall that flares outwardly from the top, and an indentation in a bottom with an opening with a wider size such that the tray is capable of being stacked with an adjacent tray with the top of the tray nesting in an indentation of an adjacent top tray.

9. The fluid sample display in accordance with claim 1, wherein the tray has a hanger to suspend the tray therefrom.

10. The fluid sample display in accordance with claim 1, wherein the cover is flush with a top of the tray in a closed position of the cover.

11. The fluid sample display in accordance with claim 1, further comprising:

a label applied to a top of the tray adjacent to the array of dimples;

the label comprising indicia thereon comprising:

an array of pictures of exemplary fluids forming the array of comparisons; and vehicle fluid indicia corresponding to the array of dimples and the array of comparisons with each vehicle fluid indicium indicating which vehicle fluid is to be received in each dimple and which comparison is shown adjacent to a corresponding dimple.

12. The fluid sample display in accordance with claim 1, wherein the cover is transparent and defines a window.

13. A method for displaying and comparing the actual vehicle fluid samples with exemplary fluid conditions using the fluid sample display of claim 1, the method comprising:

a) taking the actual vehicle fluid samples from the vehicle;

b) disposing each of the actual vehicle fluid samples in a different one of the plurality of dimples in the tray;

c) covering the actual vehicle fluid samples in the plurality of dimples with the cover;

d) observing the actual vehicle fluid samples with respect to the corresponding comparison of an exemplary fluid; and e) showing the actual vehicle fluid samples with the corresponding comparison of the exemplary fluid to the owner of the vehicle.

14. A fluid sample display configured for displaying and comparing actual vehicle fluid samples with exemplary fluid conditions, the fluid sample display comprising:

a) a tray;

b) an array of dimples formed in the tray configured to receive the actual vehicle fluid samples;

c) an array of comparisons disposed on the tray adjacent the array of dimples, with each dimple paired with a corresponding comparison, each comparison comprising a representation of an exemplary fluid; and d) a transparent cover pivotally coupled to the tray and pivotable between:

i) a closed position in which the cover is disposed over the array of dimples and against the tray; and ii) an open position in which the cover is disposed away from the array of dimples;

e) the cover slidably coupled to the tray and slidable with respect to the tray in the closed position between;

i) an unlocked position in which the cover is pivotal with respect to the tray; and ii) a locked position in which the cover is locked with respect to the tray.

15. The fluid sample display in accordance with claim 14, further comprising:

a channel in a top of the tray with the array of dimples disposed in the channel and with the cover removably disposed in the channel.

16. The fluid sample display in accordance with claim 14, further comprising:

at least one seal disposed between the cover and the tray when the cover is in a closed position against the tray and over the array of dimples.

17. The fluid sample display in accordance with claim 14, further comprising:

an indicia panel on the tray configured to receive removable indicia thereon indicative of a vehicle from which the actual vehicle fluid samples were received, or an owner of the vehicle, or both.

18. The fluid sample display in accordance with claim 14, wherein the tray has a top with a narrower size, a perimeter wall that flares outwardly from the top, and an indentation in a bottom with an opening with a wider size such that the tray is capable of being stacked with an adjacent tray with the top of the tray nesting in an indentation of an adjacent top tray.

19. The fluid sample display in accordance with claim 14, wherein the cover is flush with a top of the tray in a closed position of the cover.

20. A fluid sample display configured for displaying and comparing actual vehicle fluid samples with exemplary fluid conditions, the fluid sample display comprising:

a) a tray;

b) an array of dimples formed in the tray configured to receive the actual vehicle fluid samples;

c) an array of comparisons disposed on the tray adjacent the array of dimples, with each dimple paired with a corresponding comparison, each comparison comprising a representation of an exemplary fluid;

d) a cover carried by the tray and removably covering the array of dimples;

e) the cover pivotally coupled to the tray and pivotable between:

i) a closed position in which the cover is disposed over the array of dimples and against the tray; and ii) an open position in which the cover is disposed away from the array of dimples;

f) the cover slidably coupled to the tray and slidable with respect to the tray in the closed position between;

i) an unlocked position in which the cover is pivotal with respect to the tray; and ii) a locked position in which the cover is locked with respect to the tray;

g) the cover having at least a portion that is transparent disposable over the array of dimples configured to view the actual vehicle fluid samples therethrough;

h) an indicia panel on the tray configured to receive removable indicia thereon indicative of a vehicle from which the actual vehicle fluid samples were received, or an owner of the vehicle, or both;

i) at least one seal disposed between the cover and the tray when the cover is in a closed position against the tray and over the array of dimples; and j) the tray having a top with a narrower size, a perimeter wall that flares outwardly from the top, and an indentation in a bottom with an opening with a wider size such that the tray is capable of being stacked with an adjacent tray with the top of the tray nesting in an indentation of an adjacent top tray.

* * * * *